US 8,275,614 B2

(12) United States Patent
Miyamoto et al.

(10) Patent No.: US 8,275,614 B2
(45) Date of Patent: Sep. 25, 2012

(54) SUPPORT DEVICE, PROGRAM AND SUPPORT METHOD

(75) Inventors: Kohtaroh Miyamoto, Fuchu (JP); Takashi Saitoh, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 825 days.

(21) Appl. No.: 12/428,907

(22) Filed: Apr. 23, 2009

(65) Prior Publication Data

US 2009/0271193 A1 Oct. 29, 2009

(30) Foreign Application Priority Data

Apr. 23, 2008 (JP) ................. 2008-113190

(51) Int. Cl.
*G10L 15/26* (2006.01)
*G10L 15/00* (2006.01)
*G10L 21/00* (2006.01)
*G10L 11/00* (2006.01)
*H04M 1/64* (2006.01)

(52) U.S. Cl. ........ 704/235; 704/231; 704/251; 704/270; 379/88.04

(58) Field of Classification Search .................. 704/235
See application file for complete search history.

(56) References Cited

U.S. PATENT DOCUMENTS

| 6,912,498 | B2 * | 6/2005 | Stevens et al. ................. 704/235 |
| 7,069,213 | B2 * | 6/2006 | Thompson .................... 704/231 |
| 7,415,406 | B2 * | 8/2008 | Huang et al. ...................... 704/9 |
| 7,672,846 | B2 * | 3/2010 | Washio et al. ................. 704/251 |
| 2002/0133340 | A1 * | 9/2002 | Basson et al. ................. 704/235 |
| 2003/0074199 | A1 * | 4/2003 | Kuzunuki et al. .......... 704/270.1 |
| 2008/0101556 | A1 * | 5/2008 | Kim et al. .................. 379/88.04 |

FOREIGN PATENT DOCUMENTS

| JP | 2000324395 | 11/2000 |
| JP | 2003046861 | 2/2003 |
| JP | 2006227319 | 8/2006 |

OTHER PUBLICATIONS

Yoshiyuki Yamada, "A spontaneous speech recognition method by adjusting phoneme lengths", Information Processing Society of Japan, IPSJ SIG Notes vol. 2005, No. 103, p. 1-6.
Akira Baba, "Evaluation Method of Acoustic Models for the Elderly in Speech Recognition", Technical report of Matsushita Electric Works Ltd., Nov. 2002, p. 20-26.

* cited by examiner

*Primary Examiner* — James S. Wozniak
*Assistant Examiner* — Neeraj Sharma
(74) *Attorney, Agent, or Firm* — Vazken Alexanian

(57) ABSTRACT

A support device, program and support method for supporting generation of text from speech data. The support device includes a confirmed rate calculator, a candidate obtaining unit and a selector. The confirmed rate calculator calculates a confirmed utterance rate which is an utterance rate of a confirmed part having already-confirmed text in the speech data. The candidate obtaining unit obtains multiple candidate character strings resulting from a speech recognition of an unconfirmed part having unconfirmed text in the speech data. The selector preferentially selects, from among the plurality of candidate character strings, a candidate character string whose utterance time consumed in uttering the candidate character string at the confirmed utterance rate is closest to an utterance time of the unconfirmed part of the speech data.

17 Claims, 10 Drawing Sheets

SUPPORT DEVICE, PROGRAM AND SUPPORT METHOD

CROSS-REFERENCE TO RELATED APPLICATIONS

This application claims priority under 35 U.S.C. §119 from Japanese Patent Application No. 2008-113190 filed Apr. 23, 2008, the entire contents of which are incorporated herein by reference.

BACKGROUND OF THE INVENTION

1. Field of the Invention

The present invention relates to a support device, a program and a support method. Specifically, the present invention relates to a support device, a program and a support method for supporting generation of text from speech data.

2. Description of Related Art

Recently, converting speech to text has been used to enhance accessibility for hearing-impaired people and elderly people. Such text is generated by use of a speech recognition device. For examples, see Tatsuya Akagawa, Koji Iwano, and Sadaoki Furui, "Model construction for spoken language text-to-speech using HMM, and the influence on the synthesized speech" ("HMM wo mochiita hanashikotoba onseigousei ni okeru moderu no kouchiku to sono gouseionsei eno eikyou"), The Journal of The Acoustic Society of Japan, 2007 March, p. 201-202; Yoshiyuki Yamada, Miyajima Chiyomi, Itou Katsunobu, and Takeda Kazuya, "A spontaneous speech recognition method by adjusting phoneme lengths" ("Onsochou shinshuku ni yoru taiwaonseininshikiseinou no koujyoushuhou"), Information Processing Society of Japan, IPSJ SIG Notes Vol. 2005, No. 103(20051021), p. 1-6; and Akira Baba, "Evaluation Method of Acoustic Models for the Elderly in Speech Recognition" ("Onseininshiki no tameno koureishamuke onkyoumoderu no hyoukahou"), Technical report of Matsushita Electric Works. Ltd, Special Issue on "Analysis and Evaluation Technology for Creating Customer Value" ("kokyakukachi wo soushutsu suru kaisekihyoukagijyutsu"), 2002 November, p. 20-26).

With the speech recognition device in the current state, it is difficult to generate 100% reliable text from speech data. In other words, text generated from speech data by the speech recognition device in the current state includes an unconfirmed part having a relatively low reliability. As a result, an operator has to correct the text by manually inputting a character string. However, such correction requires long working hours.

In the process of generating text from speech, the speech recognition device carries out processing for segmenting the speech, creating multiple candidate character strings for each segmented part, and selecting a character string from among the multiple candidates. Accordingly, the operator may correct the unconfirmed part having a relatively low reliability by causing the multiple candidate character strings to be displayed and by manually selecting an appropriate character string from among these candidates. However, since the speech recognition device creates an enormous number of candidate character strings, selection of a single character string from among the candidates also requires long working hours.

Moreover, the operator carries out such a correction of the unconfirmed part, for example, sequentially from the beginning in certain segmentation units (for example, every several characters). In this case, a support device is employable which is capable of automatically specifying a range of speech data corresponding to the character string whose content has been confirmed by the text correction and then automatically finding the top part of the next speech data to be subjected to text correction. By employing such a support device, the operation can be facilitated since the operator does not need to listen to the speech data for finding the top part of the next speech data to be subjected to text confirmation.

In order to automatically specify the portion where the text has been confirmed in the speech data, an acoustic analysis needs to be performed on the speech data by use of a computer. However, in the present circumstances, use of such a method is not sufficiently accurate to specify the portion where the text has been confirmed in the speech data.

Japanese Patent Application Publications Nos. 2000-324395, 2003-46861, and 2006-227319 disclose techniques for specifying a time range of speech data. Japanese Patent Application Publication No. 2000-324395 discloses a technique for segmenting a subtitle text on which a subtitle is based, and then assigning timing information to each segmented part according to reference timing information and character information. Here, the character information includes types of characters, the number of characters, and a string of phonetic signs. Japanese Patent Application Publication 2003-46861 discloses a technique with which, when a key input is made while a subtitle is displayed on a monitor, the operation timing and type of key are recorded. Japanese Patent Application Publication 2006-227319 discloses a technique for estimating a probability distribution of the duration lengths of components such as phonemes or syllables, and a probability distribution of the utterance rate.

However, the portion where the text has been confirmed in the speech data cannot be accurately specified even with the techniques disclosed above. Accordingly, under the present circumstances, an operator needs to listen to speech data in order to specify the portion of speech data corresponding to the character string whose text has been confirmed.

SUMMARY OF THE INVENTION

In one aspect of the present invention, a support device for supporting generation of text from speech data is provided. The support device includes a confirmed rate calculator, a candidate obtaining unit and a selector. The confirmed rate calculator calculates a confirmed utterance rate which is an utterance rate of a confirmed part having already-confirmed text in the speech data. The candidate obtaining unit obtains multiple candidate character strings which are a speech recognition result of an unconfirmed part having unconfirmed text in the speech data. The selector preferentially selects, from among the plurality of candidate character strings, a candidate character string whose utterance time consumed to utter the candidate character string at the confirmed utterance rate is closest to an utterance time of the unconfirmed part of the speech data.

A second aspect of the present invention provides a support device for supporting generation of text from moving image data in which a speaker expresses sentences by gestures. The support device includes a confirmed expression rate calculator, a candidate obtaining unit and a selector. The confirmed expression rate calculator calculates a confirmed expression rate which is an expression rate of a confirmed part having already-confirmed text in the moving image data. The candidate obtaining unit obtains multiple candidate character strings which are an image recognition result of an unconfirmed part having unconfirmed text in the speech data. The selector preferentially selects, from among the plurality of candidate character strings, a candidate character string whose expression time consumed to express the candidate character string at the confirmed expression rate is closest to the expression time of the unconfirmed part of the moving image data.

The invention also provides a program which causes a computer to function as the support device, and a support method employing the support device.

DETAILED DESCRIPTION OF THE PREFERRED EMBODIMENTS

For a more complete understanding of the present invention and the advantages thereof, reference is now made to the following description of the preferred embodiments taken in conjunction with the accompanying drawings.

Figure 1:
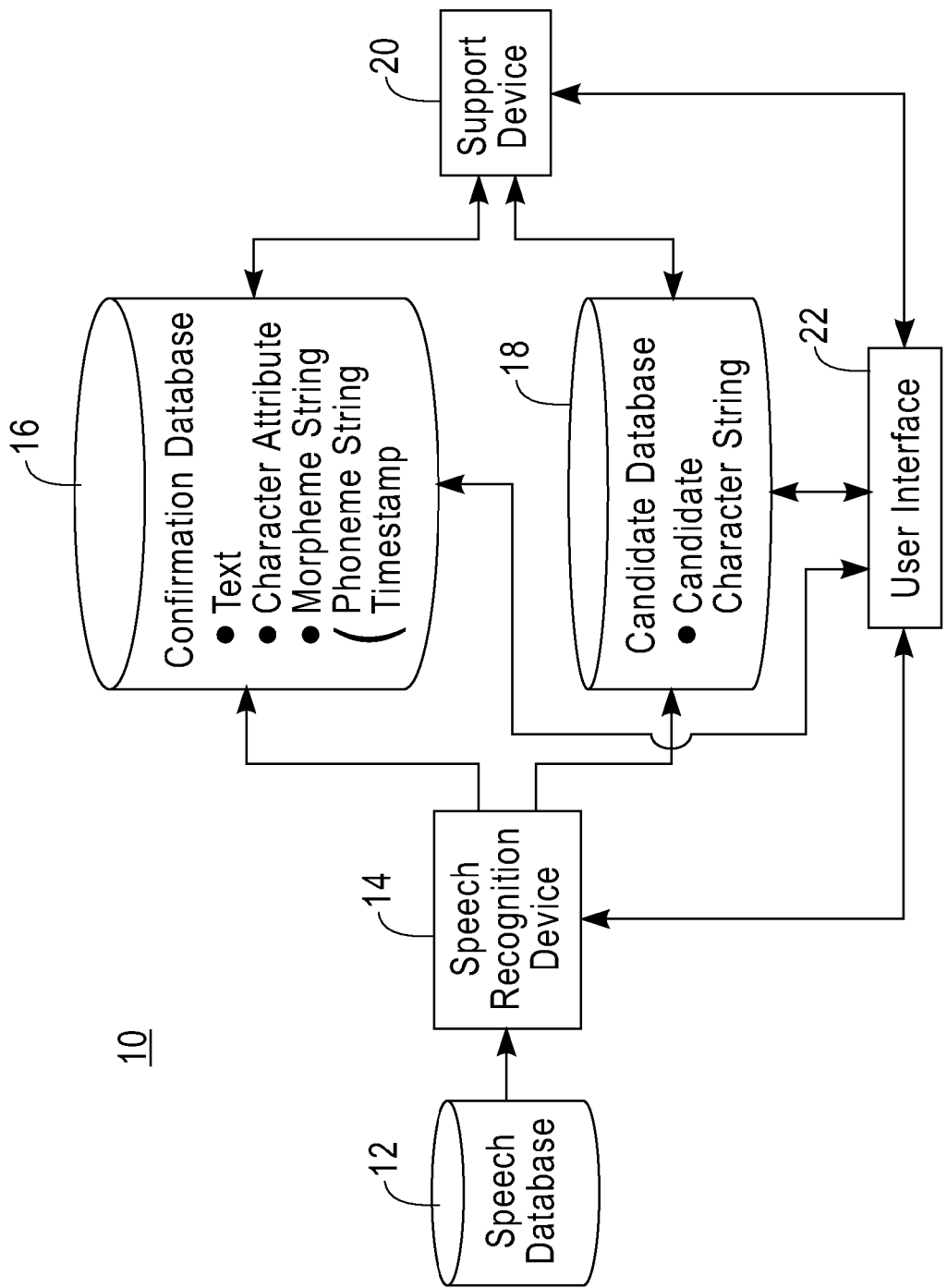
FIG. 1 illustrates a structure of a speech recognition system 10 according to the embodiment.

FIG. 1 illustrates a structure of a speech recognition system 10 according to the present embodiment. The speech recognition system 10 generates text (i.e. character strings) indicating contents of speech included in speech data.

The speech recognition system 10 includes a speech database 12, a speech recognition device 14, a confirmation database 16, a candidate database 18, a support device 20 and a user interface 22. The speech database 12 stores subject speech data for generating text.

The speech recognition device 14 performs speech recognition on subject speech data. The speech recognition device 14 may be implemented, for example, by a computer executing a speech recognition program. The speech recognition device 14 may be implemented by a computer executing IBM ViaVoice (registered trademark) which is an exemplar speech recognition program.

The confirmation database 16 stores text and morpheme strings, obtained as a result of speech recognition performed on the speech data by the speech recognition device 14. Text refers to a character string indicating contents of speech included in speech data. A morpheme string is information obtained by segmenting a phoneme string, indicating sounds of speech included in speech data, into minimum units of words each having a meaning. A timestamp indicating the time when a phoneme is outputted may, for example, also be associated with each phoneme included in a morpheme string.

Moreover, the confirmation database 16 may also store, in association with each character in the text, a character attribute indicating whether a speech recognition result thereof is confirmed or unconfirmed. A part for which speech recognition is confirmed may refer to, for example, a part where the likelihood of characters is not less than a reference value. Meanwhile, a part for which speech recognition is unconfirmed may refer to, for example, a part where the likelihood of characters is less than a reference value.

The candidate database 18 stores multiple candidate character strings obtained as a result of speech recognition performed on the speech data by the speech recognition device 14. In the process of generating text from the speech data, the speech recognition device 14 carries out processing for segmenting the speech, creating multiple candidate character strings for each segmented part, and selecting a character string from among the multiple candidates. The candidate database 18 stores such candidate character strings in association with each of multiple character strings which are included in the text stored in the confirmation database 16.

The support device 20 supports generation of text from the speech data. To be specific, the support device 20 supports a correction operation by an operator who is a user of the speech recognition device 10. The operator inputs a correct character string for a part of text for which speech recognition is unconfirmed. This unconfirmed part is included in the text stored in the confirmation database 16, which is obtained as a result of speech recognition performed on the speech data by the speech recognition device 14. Such a support device 20 may be implemented, for example, by a computer executing a support program.

User interface 22 outputs and receives information to and from the operator. The user interface 22 may be a keyboard, a mouse, a monitor and a speaker, for example.

In the speech recognition system 10 having the above-mentioned structure, in the first step, the speech recognition device 14 performs speech recognition on the subject speech data. Subsequently, in the second step, an operator sequentially corrects text for which the speech recognition result of the speech recognition device 14 is unconfirmed, for each certain portion. The operator carries out the correction by inputting correct character strings by use of the support device 20.

Additionally, the structure of the speech recognition system 10 does not necessarily need to include the speech database 12 and the speech recognition device 14. In this case, the speech recognition system 10 receives a result of speech recognition from outside, and stores the received speech recognition result in the confirmation database 16 and the candidate database 18.

Figure 2:
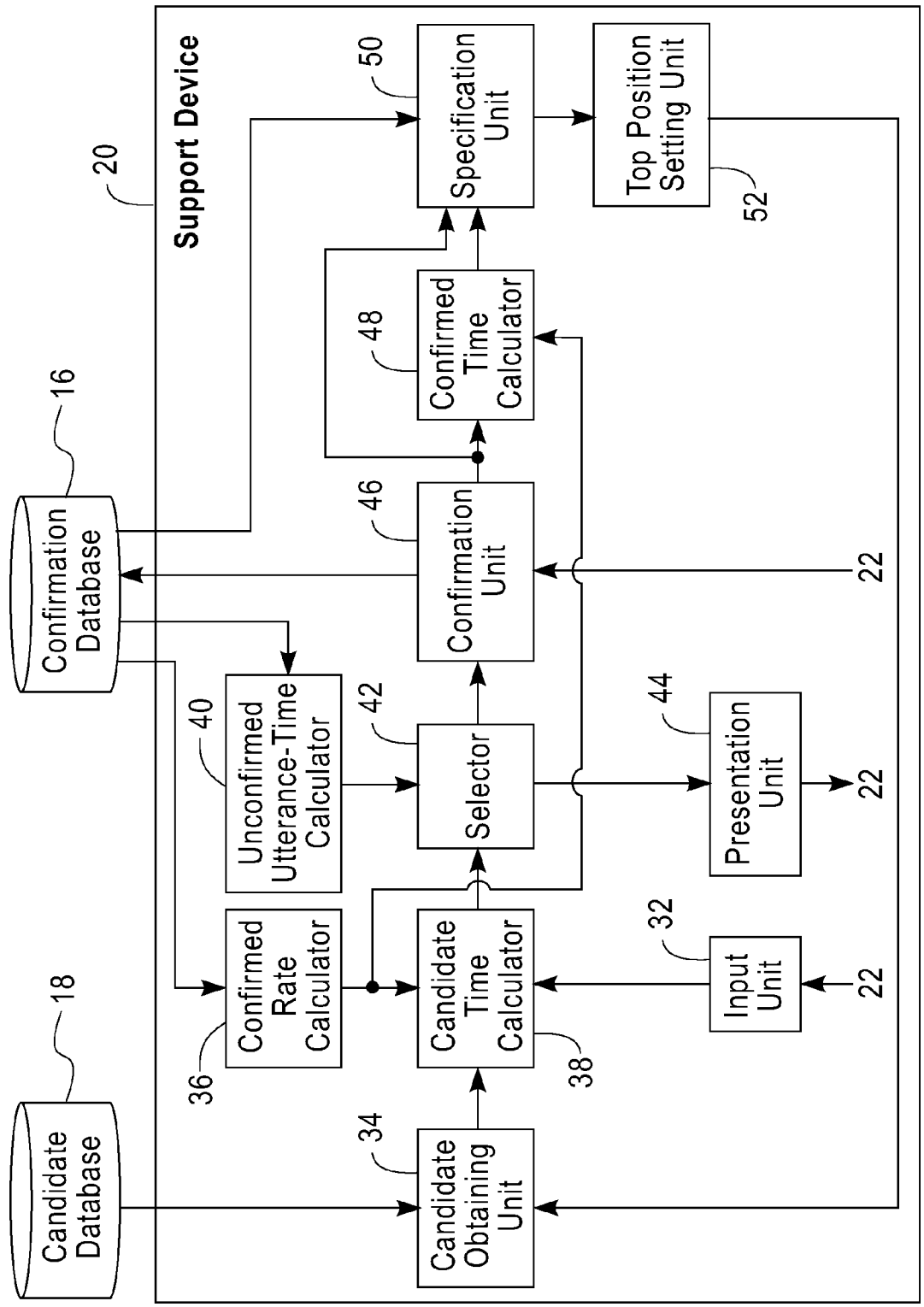
FIG. 2 illustrates a structure of a support device 20 of the embodiment together with a confirmation database 16 and a candidate database 18.

FIG. 2 illustrates a structure of the support device 20 according to the present embodiment, together with the confirmation database 16 and the candidate database 18. The support device 20 includes an input unit 32, a candidate obtaining unit 34, a confirmed rate calculator 36, a candidate time calculator 38, an unconfirmed utterance-time calculator 40, a selector 42, a presentation unit 44, a confirmation unit 46, a confirmed time calculator 48, a specification unit 50, and a top position setting unit 52.

The input unit 32 receives information inputted by the operator through the user interface 22.

The candidate obtaining unit 34 receives a focus designating the top position of an unconfirmed part having unconfirmed text in speech data. A focus may be, for example, information designating a phoneme at the top of an unconfirmed part where text is unconfirmed. By using such a focus, the support device 20 can designate a range of the speech data including the next character string to be confirmed by using the focus to designate the top position of the unconfirmed part having unconfirmed text in speech data.

The candidate obtaining unit 34 receives a focus from the top position setting unit 52. At the beginning of an operation, a focus designating an operator's optional position in the speech data, for example, may be given to the candidate obtaining unit 34 by the operator through the user interface 22.

Moreover, the candidate obtaining unit 34 obtains, from the candidate database 18, multiple candidate character strings which are the result of speech recognition performed on the unconfirmed part having unconfirmed text in speech data. The candidate obtaining unit 34 may obtain from the candidate database 18, for example, multiple candidate character strings used to generate text within a predetermined range (such as within a certain number of characters, a certain number of phonemes or a certain number of morphemes) from the position designated by a focus.

The confirmed rate calculator 36 calculates a confirmed utterance rate which is an utterance rate of a confirmed part having already-confirmed text in speech data. For example, the confirmed rate calculator 36 may calculate, as a confirmed utterance rate, the number of moras or syllables uttered per unit time in the confirmed part having already-confirmed text in speech data. Thus, the confirmed rate calculator 36 is capable of calculating an utterance rate specific to a subject speaker making a speech in subject speech data.

The candidate time calculator 38 receives the multiple candidate character strings obtained by the candidate obtaining unit 34. Then, the candidate time calculator 38 calculates, for each of the received multiple candidate character strings, the utterance time consumed when the candidate character string is uttered at the confirmed utterance rate. This calculation is made based on the number of moras or syllables in the candidate character string, and the confirmed utterance rate. Thus, the candidate time calculator 38 is capable of calculating an estimated utterance time consumed when the subject speaker utters each of the multiple candidate character strings.

The unconfirmed utterance-time calculator 40 calculates an utterance time consumed for an unconfirmed part having unconfirmed text in speech data. For example, the unconfirmed utterance-time calculator 40 may calculate, as the utterance time consumed for an unconfirmed part of speech, a time range between a position designated by a focus and a position immediately before the first silent part after the position designated by the focus. Thus, the unconfirmed utterance-time calculator 40 is capable of calculating an utterance time of actual speech for a portion to be subjected to character-string correction in an unconfirmed part where text is unconfirmed.

According to the utterance time consumed to utter each candidate character string at the confirmed utterance rate, the selector 42 preferentially selects a candidate character string from the multiple candidate character strings obtained by the candidate obtaining unit 34. Here, the selected candidate character string has the utterance time closest to the utterance time of the unconfirmed part in the speech data calculated by the unconfirmed utterance-time calculator 40. The selector 42 may make a comparison, for example, by calculating the difference or ratio between the utterance time of actual speech of the unconfirmed part of speech data and the estimated utterance time consumed to utter each of the multiple candidate character strings at the confirmed utterance rate. Here, the selector 42 may select one or multiple candidate character strings having the smallest differences, or having ratios closest to 1. Thus, the selector 42 is capable of selecting a candidate character string whose estimated time of utterance by the subject speaker is closest to the utterance time of actual speech in the speech data. In other words, the selector 42 can select the most likely candidate character string from among the multiple candidate character strings received from the candidate database 18.

The presentation unit 44 presents, through the user interface 22, the one or multiple candidate character strings selected by the selector 42. The presentation unit 44 may, for example, display on a monitor the one or multiple candidate character strings selected by the selector 42 in an order such that more likely candidate character strings are positioned in a higher position than less likely candidate character strings. Thus, the presentation unit 44 displays first the most likely character strings so that the operator can correct text by inputting a correct character string for a part where the speech recognition result is unconfirmed.

The confirmation unit 46 receives, as a confirmed character string, the character string with which the operator corrects the part of text where the speech recognition result is unconfirmed. The correction is made through the user interface 22. For example, the confirmation unit 46 may receive, as a confirmed character string, a character string used to correct text within a predetermined range from a position designated by a focus. The confirmation unit 46 writes the received confirmed character string into the confirmation database 16. Then, the confirmation unit 46 rewrites a character attribute corresponding to the confirmed character string to carry a value indicating that the character string is confirmed. Thus, the confirmation unit 46 is capable of confirming a correct character string for the part of text where the speech recognition result of the speech recognition device 14 had been unconfirmed.

The confirmed time calculator 48 calculates an utterance time consumed when a confirmed character string is uttered at a confirmed utterance rate. The calculation is made based on the number of moras or syllables in the confirmed character string confirmed by the confirmation unit 46, and the confirmed utterance rate calculated by the confirmed rate calculator 36. The confirmed time calculator 48 with the above configuration is capable of calculating an utterance time consumed when a subject speaker utters the confirmed character string confirmed by the confirmation unit 46.

The specification unit 50 specifies a range of speech data corresponding to the confirmed character string confirmed by the confirmation unit 46. To be more precise, the specification unit 50 specifies, as a confirmed range, a portion of an unconfirmed part having unconfirmed text in speech data before confirmation, the portion ranging from its top position, to a position advanced from the top position by a time period consumed to utter the confirmed character string at the confirmed utterance rate.

For example, the specification unit 50 may specify, as a confirmed range, a portion ranging from a position designated by a focus before confirmation, to a position in speech data advanced from the top position by an utterance time consumed to utter the confirmed character string at the confirmed utterance rate. In other words, the specification unit 50 may specify as a confirmed range, for example, a portion of an unconfirmed part having unconfirmed text in speech data before confirmation, the portion ranging from the first phoneme to the last phoneme uttered within the utterance time when the confirmed character string is uttered at the confirmed rate.

When a part of text is confirmed as a confirmed character string, the top position setting unit 52 changes the position designated by a focus, in the following manner. Specifically, the top position setting unit 52 changes the position designated by the focus from the position that the focus previously designated before confirmation, to a position following the confirmed range specified by the specification unit 50. Thus, when a part of text is confirmed as a confirmed character string, the top position setting unit 52 changes the top position of the unconfirmed part having unconfirmed text in speech data, in the following manner: the top position setting unit 52 changes the top position of the unconfirmed part having unconfirmed text in speech data from the top position of the unconfirmed part having unconfirmed text in speech data before confirmation to a position in speech data advanced from the top position by an utterance time consumed to utter the confirmed character string at the confirmed utterance rate.

For example, in a case where a focus designates the first phoneme of an unconfirmed part having unconfirmed text in speech data, the top position setting unit 52 may change the phoneme to be designated by the focus, in the following manner. Specifically, the top position setting unit 52 may change the phoneme to be designated by the focus, from the phoneme that the focus had designated before confirmation, to a phoneme behind the last phoneme within the confirmed range specified by the specification unit 50. In other words, when a part of text is confirmed as a confirmed character string, for example, the top position setting unit 52 may change the first phoneme in an unconfirmed part having unconfirmed text in speech data, in the following manner. Specifically, the top position setting unit 52 may change the first phoneme in an unconfirmed part having unconfirmed text in speech data, from the first phoneme in the unconfirmed part having unconfirmed text in speech data before confirmation, to a phoneme behind the last phoneme uttered in a time consumed in uttering the confirmed character string at the confirmed utterance rate. Thus, the top position setting unit 52 is capable of automatically designating the next part in the speech data for which text should be confirmed when prompting an operator to correct the next character string following the confirmed character string.

Figure 3:
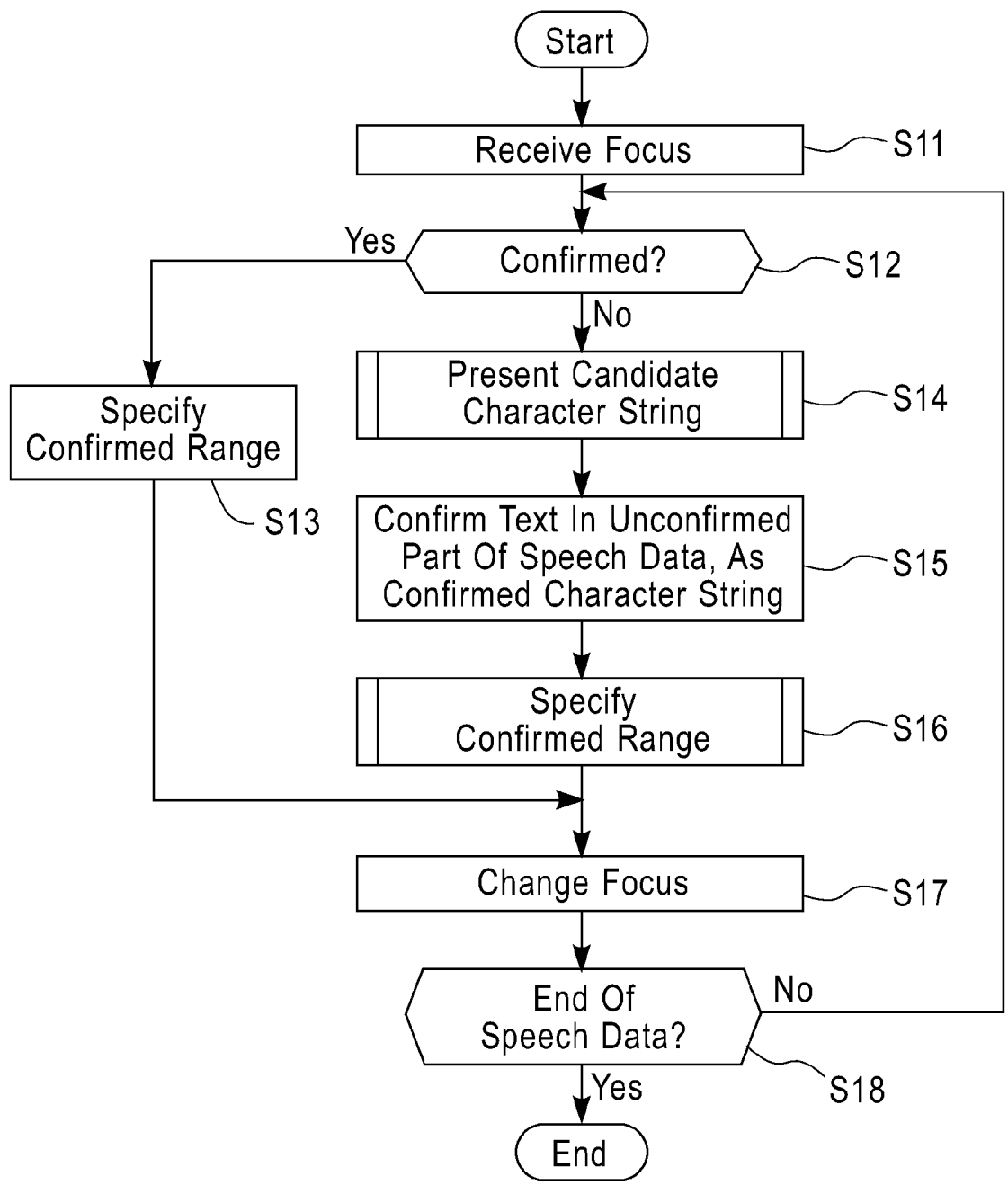
FIG. 3 illustrates a processing flow of the support device 20 of the embodiment.

FIG. 3 illustrates a processing flow of the support device 20 according to the present embodiment. For example, upon receipt of an initiation instruction from an operator the support device 20 carries out processing of steps S11 to S18 shown in FIG. 3.

First, in step S11, the candidate obtaining unit 34 receives a focus. The candidate obtaining unit 34 may, for example, receive a focus designating a position inputted by the operator.

Then, in step S12, the confirmation unit 46 judges whether or not the text following the position designated by the focus and within a predetermined range, such as, within a certain number of characters, a certain number of phonemes, or a certain number of morphemes, is confirmed. The confirmation unit 46 may, for example, judge whether or not the character attribute of the predetermined range following the position designated by the focus is set to a value indicating that the range is confirmed. The confirmation unit 46 causes the process to proceed to step S13 if the text is confirmed, and to step S14 if not.

If it is determined in step S12 that the text is confirmed, in step S13, the specification unit 50 specifies a range of speech data (i.e. confirmed range) corresponding to a character string following the position designated by the focus and following within the predetermined range (i.e. confirmed character string). For example, the specification unit 50 may specify, as a confirmed range, a portion from the first to last phonemes in a phoneme string corresponding to the confirmed character string. After specifying the confirmed range, the specification unit 50 causes the processing to proceed to step S17.

If it is determined in step S12 that the text is unconfirmed, in step S14, the support device 20 displays one or multiple candidate character strings to the operator. Details of the processing in step S14 will be described with reference to FIG. 4.

Subsequently, in step S15, the confirmation unit 46 prompts the operator to correct the text following the position designated by the focus and following within the predetermined range. Then, the specification unit 46 receives the character string corrected by the operator as a confirmed character string, and writes the received confirmed character string into the confirmation database 16. Moreover, the confirmation unit 46 rewrites the character attribute corresponding to the confirmed character string to carry a value indicating that the character string is confirmed.

Thereafter, in step S16, the specification unit 50 specifies a confirmed range of speech data corresponding to the confirmed character string confirmed in step S15. Details of the processing in step S16 will be described with reference to FIG. 6.

Then, in step S17, the top position setting unit 52 changes the position designated by the focus, from a position designated by the focus before confirmation to a position following the confirmed range specified in steps S13 or S16.

Then, in step S18, the top position setting unit 52 judges whether or not the position designated by the focus reaches the end of the speech data. If the position designated by the focus does not reach the end of the speech data, the top position setting unit 52 causes the processing to proceed to step S12. If the position designated by the focus reaches the end of the speech data, the top position setting unit 52 terminates the flow.

Figure 4:
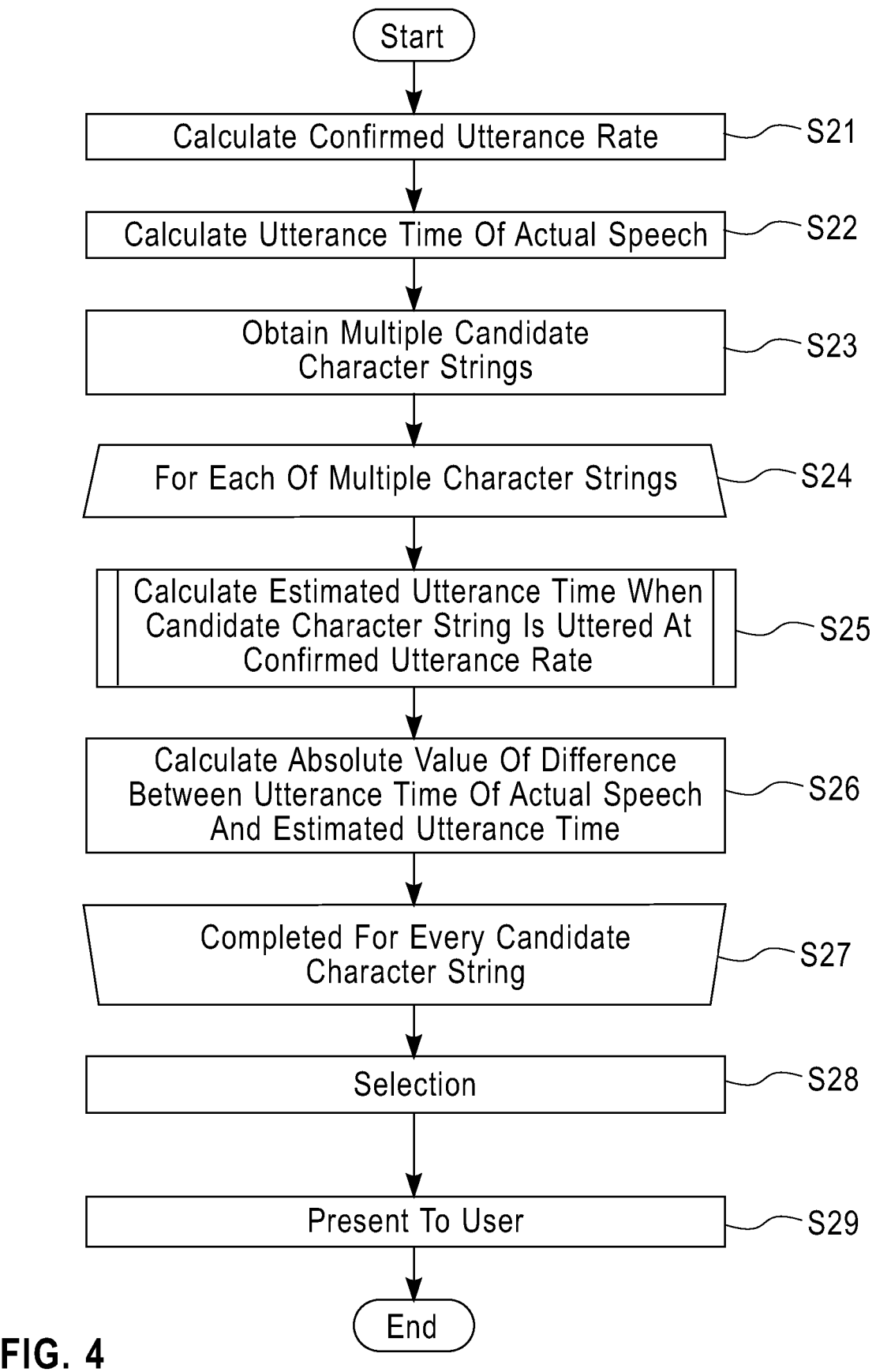
FIG. 4 illustrates an exemplar processing flow of step S14 of the processing flow in FIG. 3.

FIG. 4 illustrates an exemplar processing flow of step S14 in the processing flow shown in FIG. 3. For example, in step S14 of the processing flow in FIG. 3, the support device 20 may carry out processing of steps S21 to S29 shown in FIG. 4.

First, in step S21, the confirmed rate calculator 36 calculates a confirmed utterance rate which is an utterance rate of a confirmed part having already-confirmed text in speech data. For example, the confirmed rate calculator 36 may calculate, as a confirmed utterance rate, the number of moras or syllables uttered per unit time in the confirmed part having already-confirmed text in speech data.

The confirmed rate calculator 36 obtains from the confirmation database 16, for example, a speech recognition result for a portion of the confirmed part where text is already confirmed. In this portion of the confirmed part, a speech is made continuously, that is, the part does not include a segment where the utterance is interrupted. Subsequently, the confirmed rate calculator 36 calculates, for example, an utterance time of the confirmed part and the number of moras or syllables included in a period when the character string of the confirmed part is uttered. The calculation is made based on the obtained speech recognition result. The confirmed rate calculator 36 may calculate, for example, the difference between the timestamps of the first and last phonemes of the confirmed part as an utterance time of the confirmed part. Meanwhile, the confirmed rate calculator 36 may calculate, for example, the number of moras or syllables included in a period when the character string of the confirmed part is uttered by referring to a table, or the like, in which phoneme strings and numbers of moras or syllables are associated with each other.

The confirmed rate calculator 36 may calculate as a confirmed utterance rate, for example, a result of dividing the number of moras or syllables included in an utterance of the character string of the confirmed part by the utterance time of the confirmed part. For example, assume that a character string of the confirmed part is denoted by strD, a function for calculating the number of moras or syllables from a given character string is denoted by mora( ), and an utterance time of the confirmed part is denoted by timeDA11. Here, the confirmed rate calculator 36 may calculate, for example, a confirmed utterance rate speedA by computing the following equation:

$$speedA = mora(strD)/timeDA11.$$

Thus, the confirmed rate calculator 36 is capable of calculating a confirmed utterance rate indicating an utterance rate specific to the subject speaker.

Then, in step S22, the unconfirmed utterance-time calculator 40 calculates a time range between a position designated by a focus and a position immediately before the first silent part after the position designated by the focus. Thus, the unconfirmed utterance-time calculator 40 is capable of calculating the utterance time of actual speech of the unconfirmed part where text is unconfirmed following the position designated by the focus.

For example, the unconfirmed utterance-time calculator 40 may calculate, as an utterance time of speech of an unconfirmed part where text is unconfirmed, a time range between a phoneme designated by the focus and a phoneme immediately before the first silent part after the phoneme designated by the focus. For instance, when a speech "Arigatougozaimasu (Thank you)" is made, portions before and after the speech are often silent parts. Accordingly, the unconfirmed utterance-time calculator 40 is capable of detecting the end position of an uttered speech by detecting a phoneme immediately before a silent part.

Moreover, for example, a focus designates the first phoneme of an unconfirmed part where text is unconfirmed. Hence, the unconfirmed utterance-time calculator 40 can detect a top position of speech of an unconfirmed part where text is unconfirmed by obtaining the phoneme designated by the focus. Thus, the unconfirmed utterance-time calculator 40 is capable of calculating an utterance time of speech of an unconfirmed part where text is unconfirmed by detecting the time ranging from a position designated by a focus to a position immediately before a silent part.

In addition, the unconfirmed utterance-time calculator 40 may, for example, detect the intervals of timestamps of respective phonemes stored in the confirmation database 16. Then, the unconfirmed utterance-time calculator 40 may determine that an interval of a predetermined time or longer is a silent part. Instead, the unconfirmed utterance-time calculator 40 may detect the amplitude of speech data stored in the speech database 12, and determine that a part having a value equal to or less than a predetermined amplitude is a silent part.

Subsequently, in step S23, the candidate obtaining unit 34 obtains, from the candidate database 18, multiple candidate character strings which are the speech recognition result of the part following the position designated by the focus. The candidate obtaining unit 34 may obtain, from the candidate database 18, for example, multiple candidate character strings used in the process for generating text within a predetermined range following the position designated by the focus.

Additionally in step S23, the input unit 32 may receive input of at least a part of a character string corresponding to the unconfirmed part having unconfirmed text in speech data from the operator, such as, the first certain number of characters. In this case, the candidate obtaining unit 34 may obtain, from the speech recognition result of the unconfirmed part having unconfirmed text in speech data, multiple candidate character strings each including the character string inputted by the user in the top part thereof. Thus, the input unit 32 is capable of extracting a more precise candidate character string from among the multiple candidate character strings stored in the candidate database 18.

Then, the candidate time calculator 38 and the selector 42 carry out the processing of steps S25 and S26 for each of the multiple candidate character strings obtained in step S23 (i.e. follow S24 to S27). In step S25, the candidate time calculator 38 calculates an utterance time consumed when each candidate character string is uttered at the confirmed utterance rate. The calculation is made based on the number of moras or syllables in the candidate character string and the confirmed utterance rate calculated in step S21.

Thus, the candidate time calculator 38 is capable of calculating an estimated utterance time consumed when the subject speaker utters each of the multiple candidate character strings. Details of an exemplar structure of the candidate time calculator 38 that carries out such processing will be described with reference to FIG. 5.

Subsequently in step S26, the selector 42 calculates an absolute value of the difference between the actual utterance time of speech calculated in step S22, and the estimated utterance time, calculated in step S25, to be consumed when the candidate character string is uttered at the confirmed utterance rate. Thus, the selector 42 is capable of calculating a comparison value. A smaller comparison value indicates that the estimated utterance time for uttering the candidate character string is closer to the actual utterance time of speech in the speech data.

Upon completion of the processing of steps S25 and S26 for all of the candidate character strings, the candidate time calculator 38 and the selector 42 causes the processing to proceed to step S28. Then, in step S28, the selector 42 preferentially selects, from among the multiple candidate character strings obtained in step S23, a candidate character string whose utterance time consumed to utter the selected candidate character string at the confirmed utterance rate is closest to the actual utterance time of speech of the unconfirmed part in speech data.

The selector 42 may select one or multiple candidate character strings whose comparison value calculated in step S26 is smaller than a predetermined value. Moreover, the selector 42 may select a predetermined number of multiple candidate character strings in ascending order of the comparison values thereof, which are calculated in step S26. Thus, the selector 42 is capable of preferentially selecting the most likely one or multiple candidate character strings.

Thereafter, in step S29, the presentation unit 44 presents, to the operator through the user interface 22, the one or multiple candidate character strings preferentially selected in step S28. The presentation unit 44 may, for example, display the selected multiple candidate character strings on a monitor in ascending order of the comparison values thereof calculated in step S26.

As has been described, the support device 20 is capable of presenting to the operator a candidate character string whose estimated utterance time consumed to utter the candidate character string by the subject speaker is closest to the actual utterance time of speech. Accordingly, the support device 20 is capable of presenting to the operator the most likely candidate character string from among the multiple candidate character strings created by the speech recognition device 14 in the process of generating text from speech data. Thus, processing by an operator to correct character strings in an unconfirmed part where text is unconfirmed can be simplified by employing the support device 20. Thus, an operator can correct a character string in unconfirmed part having unconfirmed text only with a reduced load by employing the support device 20.

Figure 5:
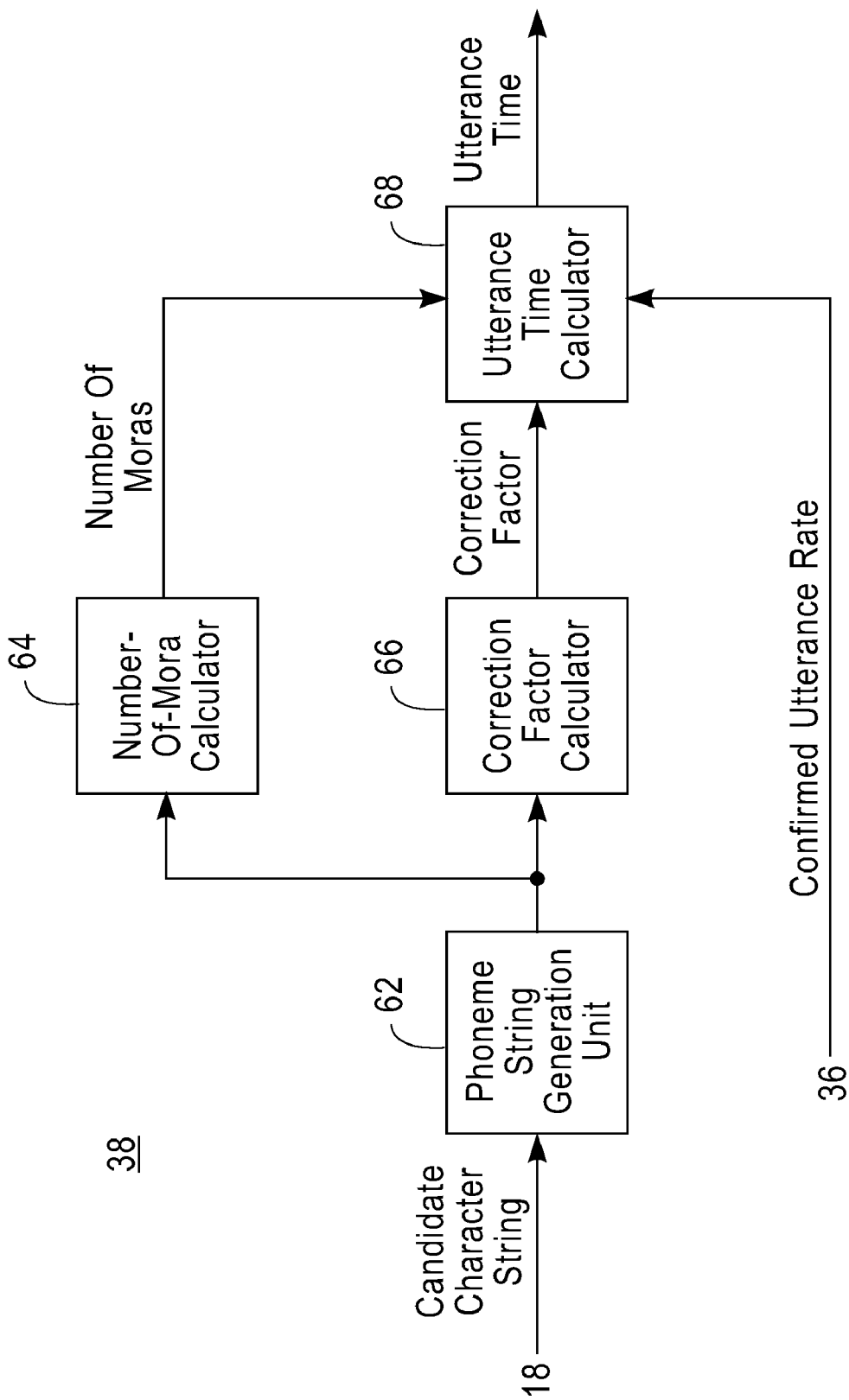
FIG. 5 illustrates an exemplar structure of a candidate time calculator 38 of the embodiment.

FIG. 5 illustrates an exemplar structure of the candidate time calculator 38 according to the present embodiment. The candidate time calculator 38 may include, for example, a phoneme string generation unit 62, a number-of-mora calculator 64, a correction factor calculator 66, and an utterance time calculator 68.

The phoneme string generation unit 62 receives a candidate character string from the candidate database 18. The phoneme string generation unit 62 generates a phoneme string of the received candidate character string. The phoneme string generation unit 62 may, for example, generate a phoneme string corresponding to a candidate character string by referring to a table in which characters and phonemes are associated with each other.

The number-of-mora calculator 64 calculates the number of moras in a candidate character string. The number-of-mora calculator 64 may, for example, calculate the number of moras included when a candidate character string is uttered by referring to a table, or the like, in which phoneme strings and numbers of moras are associated with each other.

The correction factor calculator 66 calculates a correction factor based on a phoneme string of a candidate character string. The correction factor calculator 66 may, for example, calculate a correction factor indicating a mean value of the ratios between a standard time length of a phoneme and a time length of each of the multiple phonemes included in the phoneme string of the candidate character string. To be specific, the correction factor calculator 66 may read the ratios between an individual time length and each of standard time lengths of the multiple phonemes included in the phoneme string of the candidate character string from a previously-generated table or the like. Then, the correction factor calculator 66 may output a mean value of the read multiple ratios as a correction factor.

The utterance time calculator 68 first obtains a first value by multiplying the number of moras in the candidate character string, calculated by the number-of-mora calculator 64, by the correction factor calculated by the correction factor calculator 66. Then, the utterance time calculator 68 divides the obtained first value by the confirmed utterance rate calculated by the confirmed rate calculator 36. Thus, the utterance time calculator 68 outputs the divided value as an utterance time consumed when the candidate character string is uttered at the confirmed utterance rate.

Assume, for example, that the n-th (n is an arbitrary natural number) candidate character string is denoted by strC[n], a function for calculating the number of moras in a given character string is denoted by mora( ), a function for calculating a phoneme string included in a given character string is denoted by phonemes, a function for calculating a correction factor of a given phoneme string is denoted by vp( ), and a confirmed utterance rate is denoted by speedA. Here, the utterance time calculator 68 may calculate, for example, an utterance time (time(strC[n]) consumed when a candidate character string is uttered, by computing the following equation:

$$\text{time}(\text{str}C[n]) = \{vp(\text{phoneme}(\text{str}C[n])) \times \text{mora}(\text{str}C[n])\} / \text{speed}A.$$

The utterance time consumed in uttering character strings vary depending on the types of phonemes included in the character strings. Accordingly, the candidate time calculator 38 thus configured is capable of accurately calculating an utterance time consumed when a candidate character sting is uttered at the confirmed utterance rate regardless of the types of phonemes included in the candidate character string.

Figure 6:
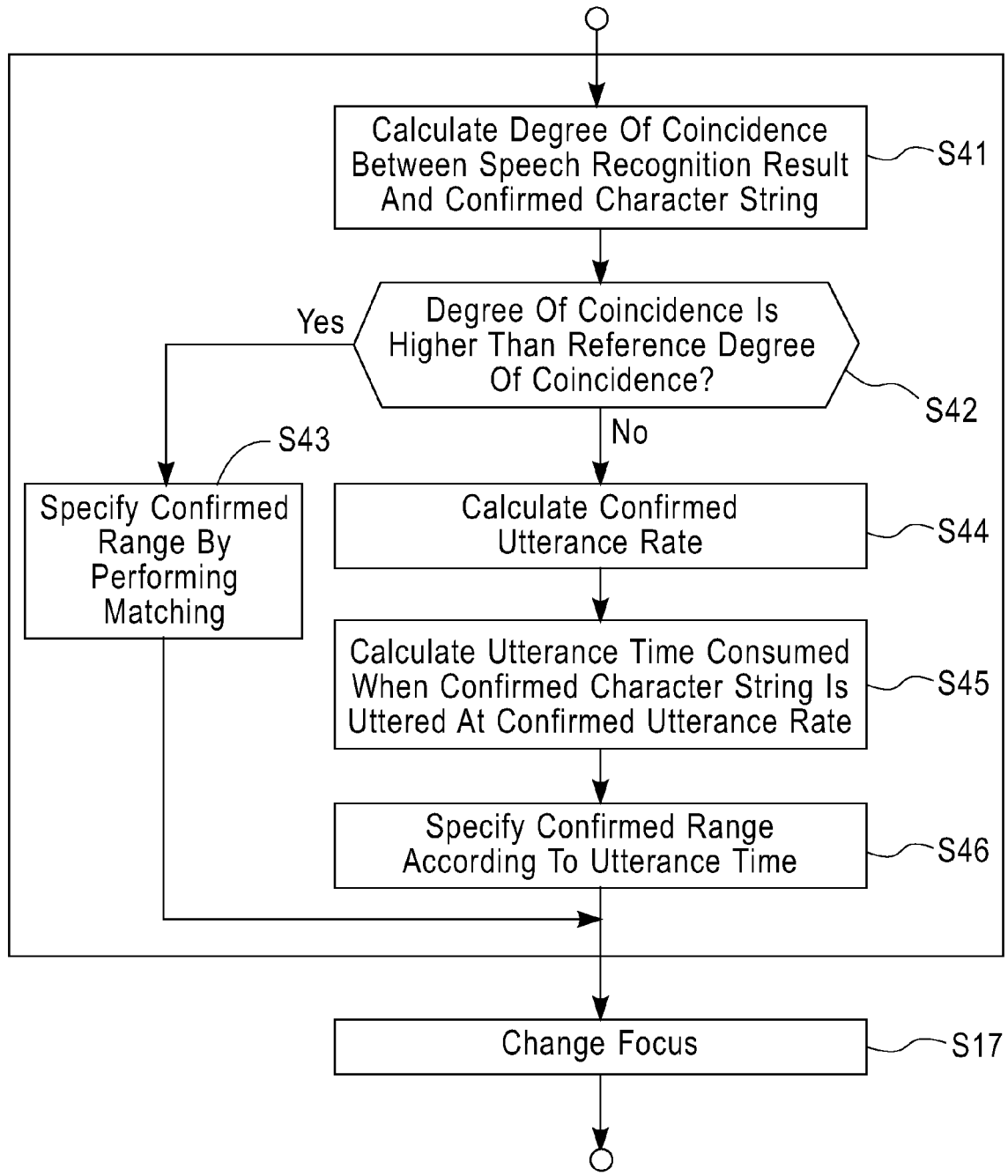
FIG. 6 illustrates an exemplar processing flow of step S16 of the processing flow in FIG. 3, together with step S17.

FIG. 6 illustrates an example of the processing flow of step S16 in the processing flow shown in FIG. 3, together with step S17. The specification unit 50 carries out the processing of the following steps S41 to S46 in step S16 in the processing flow shown in FIG. 3.

Firstly, in step S41, the specification unit 50 calculates a degree of coincidence between a confirmed character string or a phoneme string of a confirmed character string, and a character string or phoneme string of the speech recognition result at the top position of an unconfirmed part of speech data. In other words, the specification unit 50 calculates a degree of coincidence that indicates to what degree a confirmed character string confirmed by the confirmation unit 46 matches a certain character string from among the text stored in the confirmation database 16 as the speech recognition result by the speech recognition device 14. Here, the certain character string is located behind a position designated by a focus, in a portion corresponding to the confirmed character string. Alternatively, the specification unit 50 may calculate a coincidence value that indicates to what degree a phoneme string of a confirmed character string confirmed by the confirmation unit 46 matches a certain phoneme string from among the phoneme strings stored in the confirmation database 16 as the speech recognition result by the speech recognition device 14. Here, the certain phoneme string is located behind a position designated by a focus, in a portion corresponding to the confirmed character string. For example, the specification unit 50 may calculate, as a degree of coincidence, the ratio of the number of characters or phonemes in an entire confirmed character string to the number of coinciding characters or phonemes.

Subsequently in step S42, the specification unit 50 judges whether or not the degree of coincidence calculated in step S41 is higher than a reference degree of coincidence. On condition that the degree of coincidence is higher than the reference degree of coincidence, the specification unit 50 causes the processing to proceed to step S43. Meanwhile, on condition that the degree of coincidence is equal to or lower than the reference degree of coincidence, the specification unit 50 causes the processing to proceed to step S44.

If the degree of coincidence calculated in step S41 is higher than the reference degree of coincidence, the specification unit 50 specifies a range of speech data (i.e. confirmed range) corresponding to the confirmed character string in step S43. To be specific, the specification unit 50 performs matching between a character string or phoneme string of a speech recognition result, and a confirmed character string or a phoneme string of a confirmed character string. Then, the specification unit 50 specifies the first to last phonemes of the matched phonemes as the confirmed range.

More specifically, as an example processing in step S43, the specification unit 50 associates a confirmed character string with a character string following the position designated by the focus on a character-by-character basis, or associates a phoneme string corresponding to a confirmed character string with a phone string corresponding to a character string following the position designated by the focus on a phoneme-by-phone basis. Then, the specification unit 50 specifies, as the top position of the confirmed range, a character or a phoneme which follows the position designated by the focus and is associated with the first character or phoneme of the confirmed character string. Moreover, the specification unit 50 specifies, as the end of the confirmed range, a character or a phoneme which follows the position designated by the focus and is associated with the last character or phoneme of the confirmed character string.

Thus, the specification unit 50 is capable of calculating a confirmed range by performing matching between a character string or a phoneme string of the character string in the speech recognition result, and a confirmed character string or a phoneme string of the confirmed character string. Upon completion of the processing in step S43, the specification unit 50 causes the processing to proceed to step S17.

If the degree of coincidence calculated in step S41 is equal to or lower than the reference degree of coincidence, the specification unit 50, in step S44, calculates a confirmed utterance rate which is an utterance rate of a confirmed part having already-confirmed text in speech data. The specification unit 50 may, for example, obtain the confirmed utterance rate calculated by the confirmed rate calculator 36. Instead, the specification unit 50 may carry out the same processing as the confirmed rate calculator 36.

Thereafter, in step S45, the specification unit 50 calculates an utterance time consumed when the confirmed character string is uttered at the confirmed utterance rate. Thus, the specification unit 50 is capable of calculating an estimated utterance time consumed when a subject speaker utters the confirmed character string.

The specification unit 50 may, for example, calculate an utterance time consumed when the confirmed character string is uttered at the confirmed utterance rate on the basis of the number of moras or syllables in the confirmed character string and the confirmed utterance rate calculated in step S44. The specification unit 50 may, for example, have the same structure as the candidate time calculator 38 shown in FIG. 5, and calculate the utterance time of the confirmed character string by processing the confirmed character string instead of a candidate character string. Thus, the specification unit 50 is capable of accurately calculating the utterance time consumed when the confirmed character string is uttered at the confirmed utterance rate.

Subsequently, in step S46, the specification unit 50 specifies a range of speech data (i.e. confirmed range) corresponding to the confirmed character string. More specifically, in step S46, the specification unit 50 specifies, as a confirmed range, a portion of an unconfirmed part having unconfirmed text in speech data before confirmation, the portion ranging from its top position to a position advanced from the top position by a time period consumed to utter the confirmed character string at the confirmed utterance rate. Thus, the specification unit 50 is capable of automatically designating the next part in speech data to be subjected to character string confirmation, when causing an operator to confirm a character string following the confirmed character string.

For example, the specification unit 50 may specify, as a confirmed range, a portion ranging from a position designated by a focus before confirmation, to a position in speech data advanced from the top position by an utterance time consumed to utter the confirmed character string at the confirmed utterance rate. In other words, the specification unit 50 may specify as a confirmed range, for example, a portion of an unconfirmed part having unconfirmed text in speech data before confirmation, the portion ranging from the first phoneme to the last phoneme uttered within the utterance time when the confirmed character string is uttered at the confirmed rate.

The specification unit 50 is capable of specifying a range of speech data (i.e., confirmed range) corresponding to the confirmed character string by carrying out the above processing.

Then, upon completion of the processing of steps S41 to S46, the specification unit 50 causes the processing to proceed to step S17. Incidentally, for example, the specification unit 50 may skip the processing in steps S41 to S43.

Figure 7:
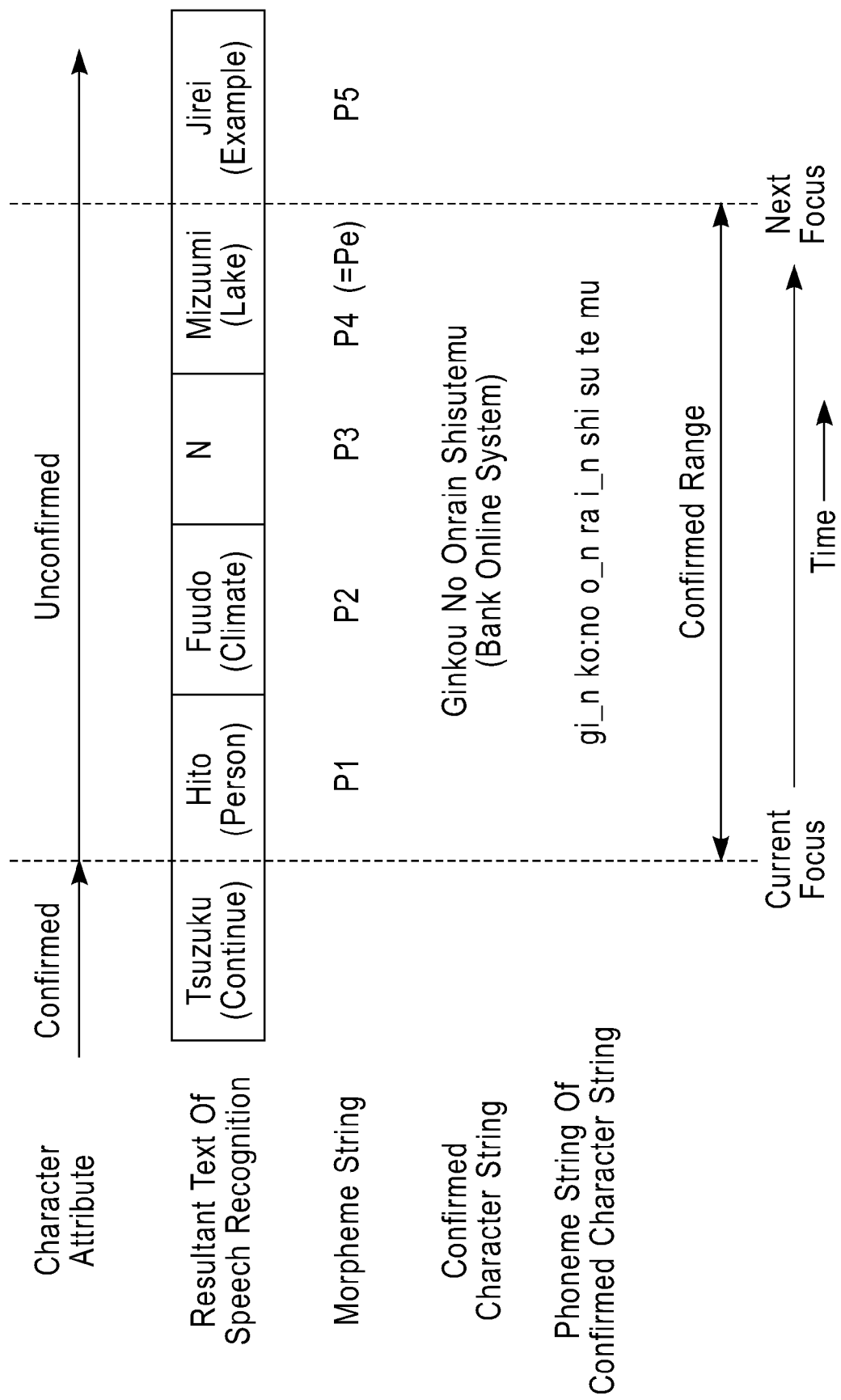
FIG. 7 illustrates an example of a focus being changed by a top position setting unit 52.

FIG. 7 illustrates an example of a focus being changed by the top position setting unit 52. In step S17, the top position setting unit 52 changes the focus. Thus, when a part of text is confirmed as a confirmed character string, the top position setting unit 52 changes the top position of the unconfirmed part having unconfirmed text in speech data.

More specifically, the top position setting unit 52 changes the position designated by the focus, from the position designated by the focus before confirmation to a position following the confirmed range specified by the specification unit 50. For example, assume a case where a focus designates a first phoneme of an unconfirmed part having unconfirmed text in speech data. Here, the top position setting unit 52 changes the phoneme to be designated by the focus to a phoneme following the last phoneme in the confirmed range specified by the specification unit 50.

For example, in the case of performing correction on an unconfirmed part having unconfirmed text in speech data by sequentially correcting the certain number of characters at a time from the top, the above-mentioned support device 20 can automatically designate the top position of the next unconfirmed part in speech data to be subjected to text confirmation when a part of text is confirmed as a confirmed character string. Hence, a load on the operator can be reduced by use of the support device 20 of the present embodiment.

Figure 8:
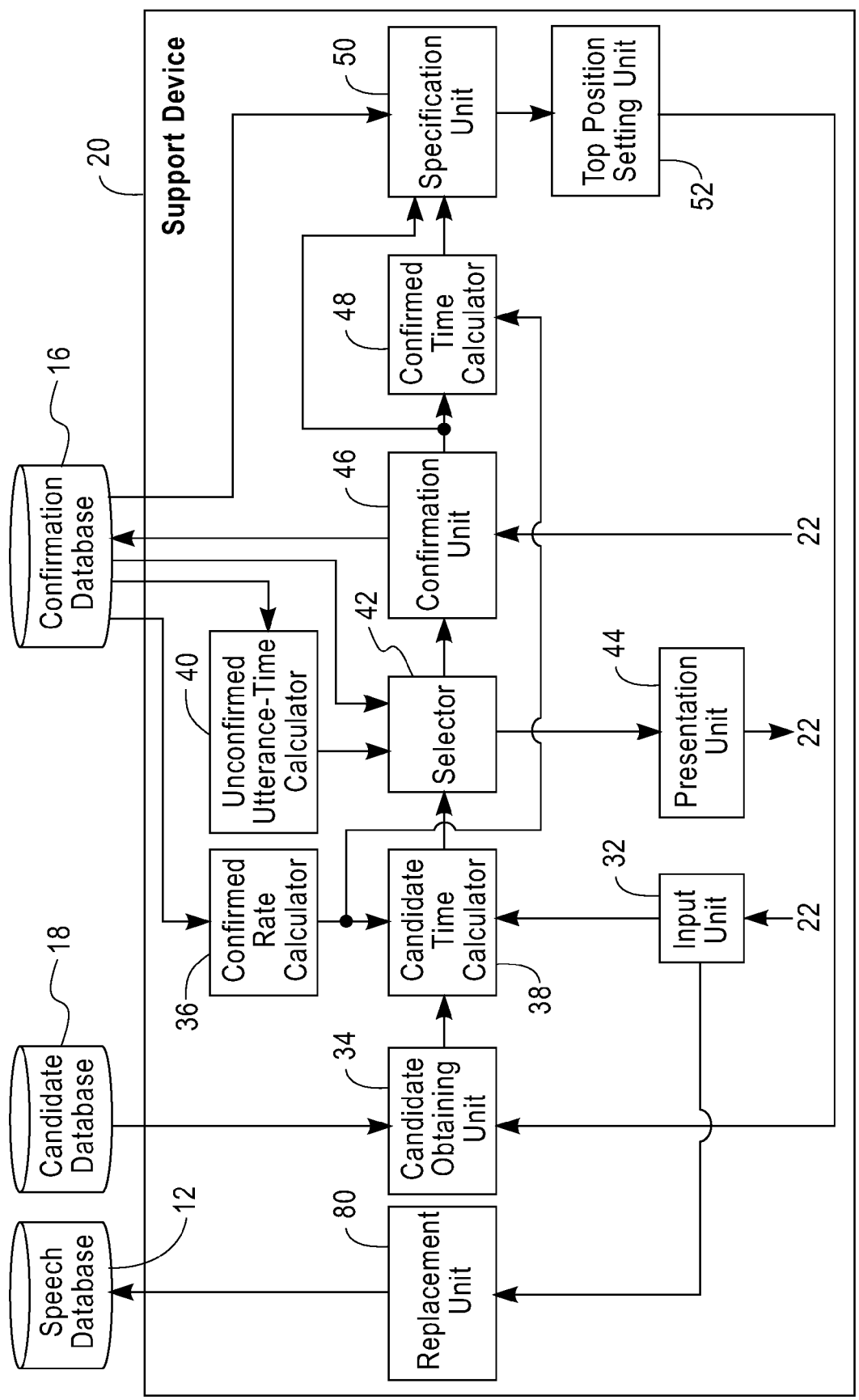
FIG. 8 illustrates a support device 20 according to a first modified example of the embodiment.

FIG. 8 illustrates a support device 20 according to a first modified example of the embodiment. The support device 20 of the first modified example employs substantially the same structure and function as the members assigned the same numerals in FIG. 2, and thus only the differences thereof will be described.

The support device 20 of the first modified example further includes a replacement unit 80. In response to an instruction for replacing speech in a confirmed part corresponding to a confirmed character string in speech data, the replacement unit 80 replaces the speech data of the part corresponding to the confirmed character string by another piece of speech data in which the confirmed character string is read aloud.

In some cases, a wrong pronunciation or the like by a subject speaker can cause a recognition error by the speech recognition device 14. For such a part including a wrong pronunciation by the speaker, the support device 20 of the first modified example is capable of replacing the original speech data by another speech data including correct speech.

Moreover, in the support device 20 of the first modified example, a selector 42 may further include the function of preferentially selecting, from among multiple candidate character strings, a candidate character string included in parts where text is already confirmed. It is highly probable that the speech recognition device 14 cannot correctly recognize specific words, such as technical terms. Additionally, it is also highly probable that the speech recognition device 14 cannot correctly recognize speech specific to a speaker, which includes the speaker's habitual saying, a dialect, or the like. Also, in many cases, the same word is frequently used in speeches by the same speaker.

Since the selector 42 of the first modified example preferentially selects a candidate character string for which text is already confirmed, the above-mentioned words can be selected with higher priority than other words. Accordingly, by using the support device 20 of the first modified example, an operator can easily correct a character string even when the speech recognition device 14 performs error recognition due to frequent appearance of a specific word or speech specific to the speaker.

Figure 9:
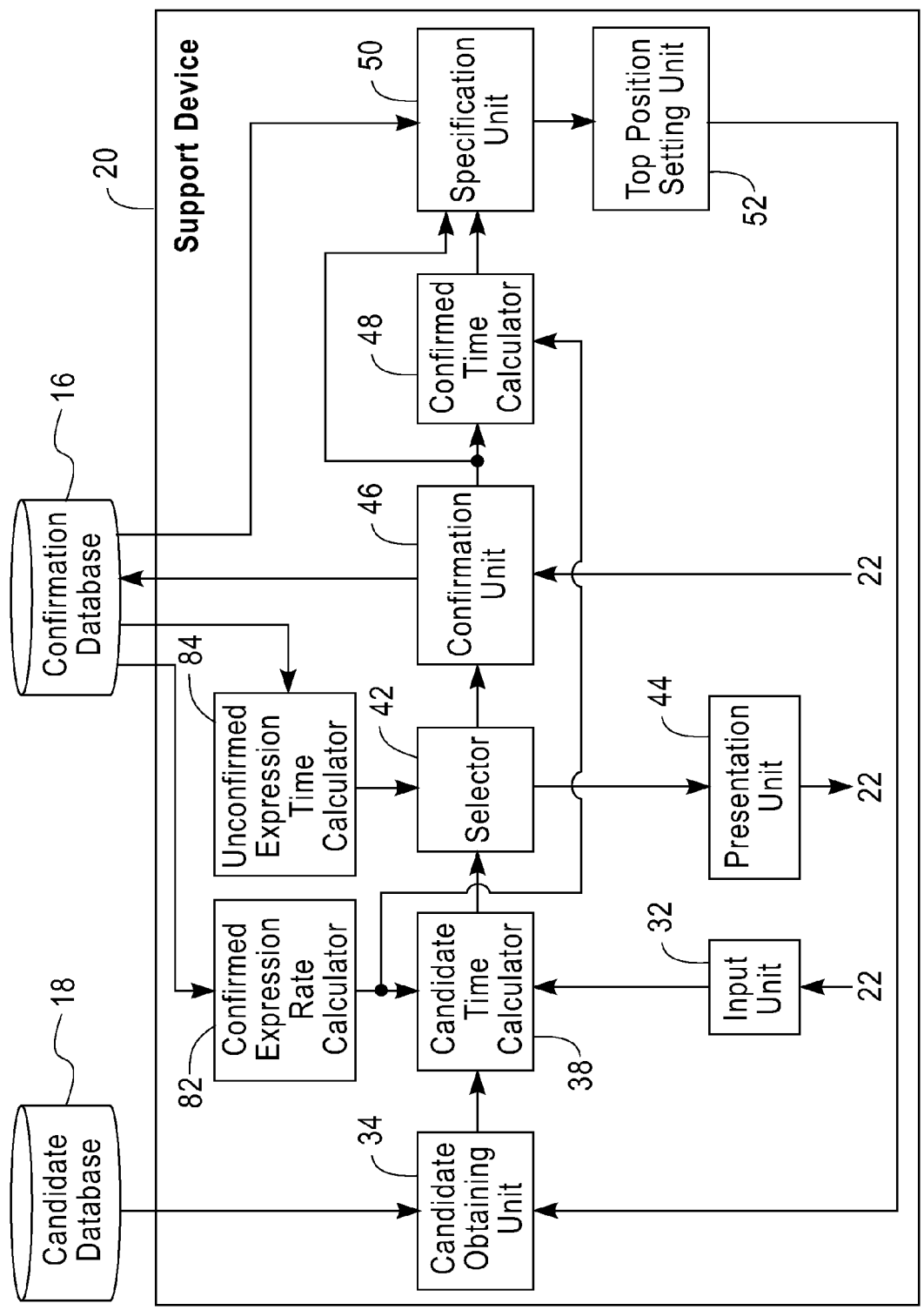
FIG. 9 illustrates a support device 20 according to a second modified example of the embodiment.

FIG. 9 illustrates a support device 20 according to a second modified example of the embodiment. The support device 20 of the second modified example employs substantially the same structure and function as the members assigned the same numerals in FIG. 2, and thus only the differences thereof will be described.

The support device 20 of the second modified example supports generation of text from moving image data in which a speaker expresses sentences by gestures. For example, the support device 20 of the second modified example supports generation of text from moving image data expressed in a sign language.

The support device 20 of the second modified example includes a confirmed expression rate calculator 82 in place of the confirmed rate calculator 36. In addition, the support device 20 of the second modified example includes an unconfirmed expression time calculator 84 in place of the unconfirmed utterance-time calculator 40.

The confirmed expression rate calculator 82 calculates a confirmed expression rate which is an expression rate of a confirmed part having already-confirmed text in moving image data. The unconfirmed expression time calculator 84 calculates an expression time of the expression in an unconfirmed part having unconfirmed text in moving image data.

Moreover, instead of a speech recognition result in which speech data is subjected to speech recognition, each member of the second modified example handles a moving image recognition result in which moving image data expressed in a sign language or the like is recognized. Furthermore, a candidate obtaining unit 34 obtains multiple candidate character strings which are the moving image recognition result of an unconfirmed part having unconfirmed text in moving image data. A selector 42 preferentially selects a candidate character string from among multiple candidate character strings. The selected character string has an expression time that is closest to the expression time of the unconfirmed part of moving image data. The expression time is the time consumed to express the candidate character string at the confirmed expression rate.

The support device 20 having the above-mentioned structure is capable of presenting the most likely candidate character string when an operator corrects a moving image recognition result. Thus, an operator can correct character strings in unconfirmed part having unconfirmed text only, with a reduced load by employing the support device 20.

Additionally, the support device 20 of the second modified example shown in FIG. 9 may be used to support generation of a score from music data. In this case, instead of a speech recognition result in which speech data is subjected to speech recognition, each member of the support device 20 handles an automatic transcription result in which notes in music data are subjected to automatic recognition.

Moreover, the confirmed expression rate calculator 82 calculates a confirmed expression rate which is an expression rate, such as a tempo, of a confirmed part of music data where notes are confirmed. The unconfirmed expression time calculator 84 calculates an expression time of the expression in an unconfirmed part having unconfirmed notes in music data.

Then, the candidate obtaining unit 34 obtains multiple candidate note strings which are the automatic transcription result of an unconfirmed part having unconfirmed notes in music data. The selector 42 preferentially selects, from among multiple candidate note strings, a candidate note string whose expression time consumed in expressing the candidate note at the confirmed expression rate is closest to the expression time of the unconfirmed part of music data.

The support device 20 having the above-mentioned structure is capable of presenting the most likely candidate note string when an operator corrects an automatic transcription result. Thus, an operator can correct note strings in unconfirmed part having unconfirmed notes with a reduced load by employing the support device 20.

Figure 10:
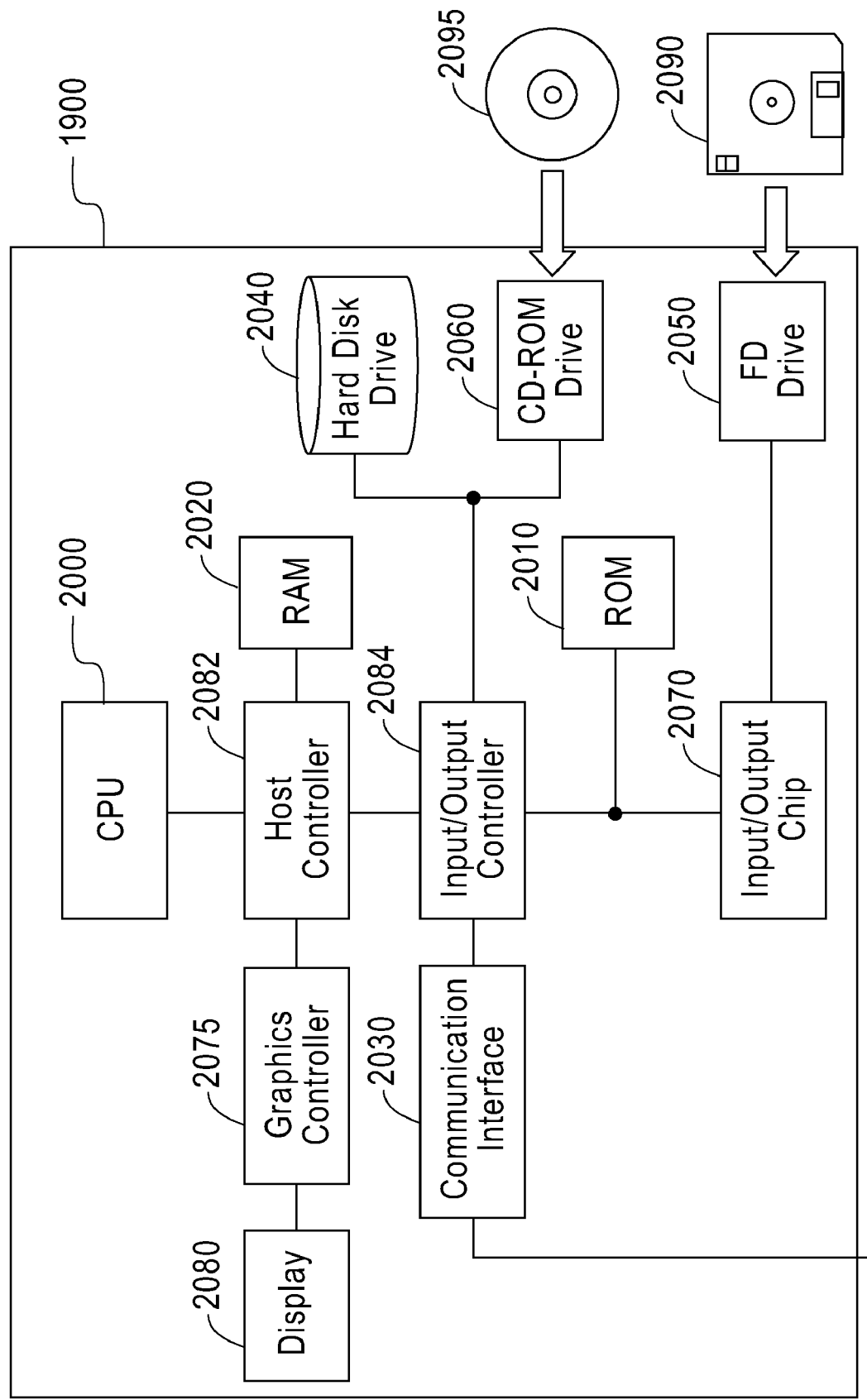
FIG. 10 illustrates an example of a hardware configuration of a computer 1900 according to the embodiment.

FIG. 10 illustrates an example of a hardware configuration of a computer 1900 according to an embodiment. The computer 1900 of the embodiment consists of a CPU peripheral unit, an input/output unit and a legacy input/output unit. The CPU peripheral unit includes a CPU 2000, a RAM 2020, a graphics controller 2075 and a display 2080 mutually connected by a host controller 2082. The input/output unit includes a communication interface 2030, a hard disk drive 2040 and a CD-ROM drive 2060 which are connected to the host controller 2082 by an input/output controller 2084. The legacy input/output unit includes a ROM 2010, a flexible disk drive 2050 and an input/output chip 2070 which are connected to the input/output controller 2084.

The host controller 2082 connects the RAM 2020 and the CPU 2000 and graphic controller 2075, the two of which access the RAM 2020 at a high transfer rate. The CPU 2000 operates based on a program stored in the ROM 2010 and the RAM 2020 and controls each of the components. The graphics controller 2075 obtains image data that the CPU 2000 or the like generates on a frame buffer provided in the RAM 2020, and displays the image on a display 2080. Alternatively, the graphics controller 2075 may include a frame buffer that stores image data generated by the CPU 2000 or the like.

The input/output controller 2084 connects the host controller 2082 and relatively high-speed input/output devices including the communication interface 2030, the hard disk drive 2040 and the CD-ROM drive 2060. The communication interface 2030 communicates with an external device through a network. The hard disk drive 2040 stores a program and data used by the CPU 2000 in the computer 1900. The CD-ROM drive 2060 reads a program or data from a CD-ROM 2095 and provides the program or data to the hard disk drive 2040 via the RAM 2020.

Moreover, relatively low-speed input/output devices such as the ROM 2010, the flexible disk drive 2050 and the input/output chip 2070 are connected to the input/output controller 2084. The ROM 2010 stores a boot program to be executed at the start up of the computer 1900 and/or programs of the computer 1900 that are dependent on the hardware of computer 1900. The flexible disk drive 2050 reads a program or data from a flexible disk 2090 and provides the program or data to the hard disk drive 2040 via the RAM 2020. In addition to the flexible disk drive 2050, the input/output chip 2070 may connect various input/output devices via a parallel port, a serial port, a keyboard port, a mouse port, and the like, for example, to the input/output controller 2084.

A program to be provided to the hard disk drive 2040 through the RAM 2020 is stored in a recording medium such as the flexible disk 2090, the CD-ROM 2095, an IC card, or the like, and is provided by a user to the hard disk drive 2040. The program is read from the recording medium, installed to the hard disk drive 2040 in the computer 1900 through the RAM 2020, to be executed by the CPU 2000.

A program installed on the computer 1900 for causing the computer 1900 to function as the support device 20 in FIG. 2 includes an input module, a candidate obtaining module, a confirmed rate calculation module, a candidate time calculation module, an unconfirmed utterance time calculation module, a selection module, a presentation module, a confirmation module, a confirmed time calculation module, a specification module, and a top position setting module. The program or modules operate with the CPU 2000, and the like, to cause the computer 1900 to function as the input unit 32, the candidate obtaining unit 34, the confirmed rate calculator 36, the candidate time calculator 38, the unconfirmed utterance-time calculator 40, the selector 42, the presentation unit 44, the confirmation unit 46, the confirmation time calculator 48, the specification unit 50 and the top position setting unit 52.

A program installed on the computer 1900 for causing the computer 1900 to function as the support device 20 in FIG. 8 further includes a replacing module. The program or module operates with the CPU 2000, and the like, to additionally cause the computer 1900 to function as the replacement unit 80.

A program installed on the computer 1900 for causing the computer 1900 to function as the support device 20 in FIG. 9 further includes a confirmed expression rate calculation module and an unconfirmed expression time calculation module. The program or modules operate with the CPU 2000 and the like to additionally cause the computer 1900 to function as the confirmed expression rate calculator 82 and the unconfirmed expression time calculator 84.

Information processing written in these programs is read into the computer 1900 and thereby causes the computer 1900 to function as the input unit 32, the candidate obtaining unit 34, the confirmed rate calculator 36, the candidate time calculator 38, the unconfirmed utterance-time calculator 40, the selector 42, the presentation unit 44, the confirmation unit 46, the confirmation time calculator 48, the specification unit 50, the top position setting unit 52, the replacement unit 80, the confirmed expression rate calculator 82 and the unconfirmed expression time calculator 84. These units are concrete means implemented by cooperation of software and the aforementioned various hardware resources. A support device 20 specific to the application can be constructed by using these concrete means to calculate or process information according to the application of the computer 1900 of the embodiment.

For example, in order to perform communication between the computer 1900 and an external device or the like, the CPU 2000 executes a communication program loaded on the RAM 2020, and instructs the communication interface 2030 to perform communication processing according to the processing content written in the communication program. Controlled by the CPU 2000, the communication interface 2030 reads transmission data stored in a transmission buffer region or the like provided in a storage device such as the RAM 2020, the hard disk drive 2040, the flexible disk 2090 or the CD-ROM 2095, or the like, and transmits the data to a network. Otherwise, the communication interface 2030 writes reception data received from the network in a reception buffer region, or the like, provided in the storage device. Thus, the communication interface 2030 may transfer transmission/reception data between itself and a storage device by the direct memory access (DMA) method. Alternatively, the CPU 2000 may transfer transmission/reception data by reading data from a storage device or communication interface 2030 of a data transfer source, and then writing the data in the communication interface 2030 or storage device of a data transfer destination.

In addition, the CPU 2000 loads all or necessary parts of files or database stored in an external storage device such as the hard disk drive 2040, the CD-ROM drive 2060 (CD-ROM 2095), or the flexible disk drive 2050 (flexible disk 2090) on the RAM 2020 by DMA transfer or the like. The CPU 2000 then carries out various processing for the data in the RAM 2020. The CPU 2000 rewrites the data having undergone the processing back into the external storage device by the DMA transfer or the like. Since the RAM 2020 can be considered to temporarily store contents of an external storage device in such processing, the RAM 2020, external storage device, and the like, are collectively referred to as memory, storage unit, a storage device, or the like, in the present embodiment. Various kinds of information in various programs, data, tables, databases, and the like, of the present embodiment are stored in such storage devices and are subjected to information processing. Note that the CPU 2000 may retain a part of the RAM 2020 in a cache memory and perform reading and writing on the cache memory. Since a cache memory still serves as a part of the function of the RAM 2020 even in this form, a cache memory is regarded as being included in at least one of the RAM 2020, a memory, and/or a storage device in the present embodiment, unless otherwise specified not to be included.

The CPU 2000 also performs various processing described in the present embodiment, which is designated by an instruction sequence of a program, on data read from the RAM 2020. Here, the processing includes various calculation, information processing, judgment of conditions, and retrieval and replacement of information. The CPU 2000 then rewrites the data back into the RAM 2020. For example, assume a case of performing judgment of conditions. The CPU 2000 firstly judges whether each of the variables indicated in the embodiment satisfies a condition such as large, small, not less than, not more than, or equal, in comparison with another variable or a constant. Then, if a condition is satisfied (or is not satisfied), the CPU 2000 causes the processing to branch to a different instruction sequence, or calls a sub-routine.

The CPU 2000 can also retrieve information stored in files, a database, or the like, in a storage device. For example, assume a case where multiple entries are stored in a storage device, and where, for each entry, an attribute value of a second attribute is associated with a corresponding attribute value of a first attribute. The attribute values of the second attribute are respectively associated with the attribute values of the first attribute. Here, the CPU 2000 may search the storage device to find, from among the multiple entries stored in the storage device, an entry whose first attribute value satisfies the condition designating a first attribute value, and then read the attribute value of the second attribute stored in the same entry. Thus, the CPU 2000 can obtain an attribute value of the second attribute which is associated with a first attribute that satisfies a predetermined condition.

The programs or modules described above may be stored in an external recording medium. Apart from the flexible disk 2090 and the CD-ROM 2095, a recording medium may include an optical recording medium such as a DVD or a CD, a magneto-optical recording medium such as an MO, a tape medium, and a semiconductor memory such as an IC card. Otherwise, the program may be provided to the computer 1900 via a network by using, as a recording medium, a storage device such as a hard disk or a RAM provided in a server system connected to a dedicated communication network or the Internet.

The present invention has been described herein with respect to its embodiments. However, the present embodiments should not be viewed as being limiting because those skilled in the art can make various modifications and refinements to the above embodiments without departing from the spirit and the scope of the appended claims.

What is claimed is:

1. A support device for supporting generation of text from speech data, comprising: a confirmed rate calculator for calculating a confirmed utterance rate which is an utterance rate of a confirmed part having already-confirmed text in the speech data; a candidate obtaining unit for obtaining a plurality of candidate character strings resulting from a speech recognition on an unconfirmed part having unconfirmed text in the speech data; and a selector for selecting one of the plurality of candidate character strings having an utterance time closest to an utterance time of the unconfirmed part in the speech data according to the utterance time consumed to utter the candidate character string at the confirmed utterance rate;
further comprising: a candidate time calculator for calculating, for each of the plurality of candidate character strings, an utterance time consumed to utter the candidate character string at the confirmed utterance rate, on the basis of the confirmed utterance rate and a number of moras or syllables in the candidate character string; wherein the confirmed rate calculator calculates, as the confirmed utterance rate, the number of moras or syllables uttered per unit time in the confirmed part having already-confirmed text in the speech data; and wherein the selector preferentially selects one of the plurality of candidate character strings having the utterance time closest to the utterance time of the unconfirmed part in the speech data according to the utterance time calculated by the candidate time calculator;
wherein the candidate time calculator comprises: a phoneme string generation unit for generating a phoneme string of the candidate character string; a correction factor calculation unit for calculating a correction factor based on a phoneme string of the candidate character string; and an utterance time calculator for calculating, as an utterance time consumed to utter the candidate character string at the confirmed utterance rate, a value obtained by a calculation where the number of moras in the candidate character string is multiplied by the correction factor and then the obtained value is divided by the confirmation utterance rate.

2. The support device according to claim 1, further comprising:
a top setting unit for changing, when a part of text is confirmed as a confirmed character string, a top position of an unconfirmed part having unconfirmed text in the speech data, from a top position of an unconfirmed part having unconfirmed text in the speech data before confirmation, to a position advanced from the top position by an utterance time consumed to utter the confirmed character string at the confirmed utterance rate.

3. The support device according to claim 2, wherein:
the top position setting unit, when a part of text is confirmed as a confirmed character string, changes a first phoneme of an unconfirmed part having unconfirmed text in the speech data, from a first phoneme of an unconfirmed part having unconfirmed text in the speech data before confirmation, to a phoneme right behind the last phoneme uttered within an utterance time consumed to utter the confirmed character string at the confirmed utterance rate.

4. The support device according to claim 3, wherein: the top position setting unit, when a degree of coincidence between any one of the confirmed character strings and a phoneme string of the confirmed character string and any one of a character strings and a phoneme string of a speech recognition result at the top position of the unconfirmed part of the speech data is higher than a reference degree of coincidence, performs matching between any one of the character strings and the phoneme string of the speech recognition result and any one of the confirmed character strings and the phoneme string of the confirmed character string, and then sets a phoneme right behind the matched last phoneme to be a first phoneme of an unconfirmed part having unconfirmed text in the speech data; and
the top position setting unit, when the degree of coincidence is equal to or lower than the reference degree of coincidence, changes the first phoneme of an unconfirmed part having unconfirmed text in the speech data, from the first phoneme of an unconfirmed part having unconfirmed text in the speech data before confirmation, to a phoneme right behind the last phoneme uttered within an utterance time consumed to utter the confirmed character string at the confirmed utterance rate.

5. The support device according to claim 2, further comprising:
a replacement unit for replacing, in response to an instruction to replace speech of a confirmed part corresponding to the confirmed character string in the speech data, speech data corresponding to the confirmed character string by speech data in which the confirmed character string is read aloud.

6. The support device according to claim 1, further comprising:
an input unit for receiving, from a user, at least a part of a character string corresponding to the unconfirmed part having unconfirmed text in the speech data;
wherein the candidate obtaining unit obtains the plurality of candidate character strings including a character string inputted by a user, from among a speech recognition result of the unconfirmed part having unconfirmed text in the speech data.

7. The support device according to claim 1, wherein the selector preferentially selects, from the plurality of candidate character strings, a candidate character string included in a part where text is already confirmed.

8. The support device of claim 1, wherein:
the confirmed rate calculator calculates a confirmed expression rate which is an expression rate of a confirmed part having already-confirmed text in moving image data;
the candidate obtaining unit obtains a plurality of candidate character strings resulting from an image recognition of an unconfirmed part having unconfirmed text in the moving image data; and
the selector selects, from among the plurality of candidate character strings, a candidate character string having an expression time closest to the expression time of the unconfirmed part of the moving image data, wherein the expression time is the time consumed to express the candidate character string at the confirmed expression rate.

9. A non-transitory computer readable medium storing computer readable instructions for causing a computer to execute the steps of: calculating a confirmed utterance rate which is an utterance rate of a confirmed part having already-confirmed text in the speech data; obtaining a plurality of candidate character strings which are a speech recognition result of an unconfirmed part having unconfirmed text in the speech data; and selecting one of the plurality of candidate character strings having the utterance time closest to the utterance time of the unconfirmed part in the speech data according to the utterance time consumed to utter the candidate character string at the confirmed utterance rate;
wherein: the calculating step calculates a confirmed expression rate which is an expression rate of a confirmed part having already-confirmed text in moving image data; the obtaining step obtains a plurality of candidate character strings resulting from an image recognition of an unconfirmed part having unconfirmed text in the moving image data; and the selecting step selects, from among the plurality of candidate character strings, a candidate character string having an expression time closest to the expression time of the unconfirmed part of the moving image data, wherein the expression time is the time consumed to express the candidate character string at the confirmed expression rate.

10. A support method for supporting generation of text from speech data, comprising the steps of: calculating a confirmed utterance rate, using a processor, which is an utterance rate of a confirmed part having already-confirmed text in the speech data; obtaining a plurality of candidate character strings which are a speech recognition result of an unconfirmed part having unconfirmed text in the speech data; and selecting one of the plurality of candidate character strings having the utterance time closest to the utterance time of the unconfirmed part in the speech data according to the utterance time consumed to utter the candidate character string at the confirmed utterance rate;

further comprising the step of: calculating a candidate utterance rate for each of the plurality of candidate character strings, wherein the candidate utterance rate is an utterance time consumed to utter the candidate character string at the confirmed utterance rate on the basis of the confirmed utterance rate and a number of moras or syllables in the candidate character string; wherein the step of calculating a confirmed utterance rate calculates, as the confirmed utterance rate, the number of moras or syllables uttered per unit time in the confirmed part having already-confirmed text in the speech data; and wherein the selecting step selects one of the plurality of candidate character strings having the utterance time closest to the utterance time of the unconfirmed part in the speech data according to the utterance time calculated by the candidate time calculator;

Wherein the step of calculating a candidate utterance rate comprises the steps of: generating a phoneme string of the candidate character string; calculating a correction factor based on a phoneme string of the candidate character string; and calculating, as an utterance time consumed to utter the candidate character string at the confirmed utterance rate, a value obtained by a calculation where the number of moras in the candidate character string is multiplied by the correction factor and then the obtained value is divided by the confirmation utterance rate.

11. The support method according to claim 10, further comprising the step of:
changing, when a part of text is confirmed as a confirmed character string, a top position of an unconfirmed part having unconfirmed text in the speech data, from a top position of an unconfirmed part having unconfirmed text in the speech data before confirmation, to a position advanced from the top position by an utterance time consumed to utter the confirmed character string at the confirmed utterance rate.

12. The support method according to claim 11, wherein:
the step of changing, when a part of text is confirmed as a confirmed character string, changes a first phoneme of an unconfirmed part having unconfirmed text in the speech data, from a first phoneme of an unconfirmed part having unconfirmed text in the speech data before confirmation, to a phoneme right behind the last phoneme uttered within an utterance time consumed to utter the confirmed character string at the confirmed utterance rate.

13. The support method according to claim 10, further comprising the steps of: performing, when a degree of coincidence between any one of the confirmed character strings and a phoneme string of the confirmed character string and any one of a character strings and a phoneme string of a speech recognition result at the top position of the unconfirmed part of the speech data is higher than a reference degree of coincidence, matching between any one of the character strings and the phoneme string of the speech recognition result and any one of the confirmed character strings and the phoneme string of the confirmed character string, and then sets a phoneme right behind the matched last phoneme to be a first phoneme of an unconfirmed part having unconfirmed text in the speech data; and changing, when the degree of coincidence is equal to or lower than the reference degree of coincidence, the first phoneme of an unconfirmed part having unconfirmed text in the speech data, from the first phoneme of an unconfirmed part having unconfirmed text in the speech data before confirmation, to a phoneme right behind the last phoneme uttered within an utterance time consumed to utter the confirmed character string at the confirmed utterance rate.

14. The support method according to claim 11, further comprising the step of:
replacing, in response to an instruction to replace speech of a confirmed part corresponding to the confirmed character string in the speech data, speech data corresponding to the confirmed character string by speech data in which the confirmed character string is read aloud.

15. The support method according to claim 10, further comprising the step of:
receiving, from a user, at least a part of a character string corresponding to the unconfirmed part having unconfirmed text in the speech data;
wherein the obtaining step obtains the plurality of candidate character strings including a character string inputted by a user, from among a speech recognition result of the unconfirmed part having unconfirmed text in the speech data.

16. The support method according to claim 10, wherein the selecting step selects, from the plurality of candidate character strings, a candidate character string included in a part where text is already confirmed.

17. The support method of claim 10, wherein:
the calculating step calculates a confirmed expression rate which is an expression rate of a confirmed part having already-confirmed text in the moving image data;
the obtaining step obtains a plurality of candidate character strings resulting from an image recognition of an unconfirmed part having unconfirmed text in the moving image data; and
the selecting step selects, from among the plurality of candidate character strings, a candidate character string having an expression time closest to the expression time of the unconfirmed part of the moving image data, wherein the expression time is the time consumed to express the candidate character string at the confirmed expression rate.

* * * * *